(12) United States Patent
Lofthouse et al.

(10) Patent No.: US 12,190,659 B2
(45) Date of Patent: *Jan. 7, 2025

(54) SYSTEM AND METHOD FOR CONTROLLING A LOCKING DIFFERENTIAL OF AN AXLE

(71) Applicant: Dana Automotive Systems Group, LLC, Maumee, OH (US)

(72) Inventors: Casey R. Lofthouse, Lima, OH (US); Justin Davis, Maumee, OH (US)

(73) Assignee: DANA AUTOMOTIVE SYSTEMS GROUP, LLC, Maumee, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/466,697

(22) Filed: Sep. 13, 2023

(65) Prior Publication Data

US 2023/0419750 A1    Dec. 28, 2023

Related U.S. Application Data

(63) Continuation of application No. 17/448,027, filed on Sep. 17, 2021, now Pat. No. 11,804,081, which is a continuation of application No. 16/847,530, filed on Apr. 13, 2020, now Pat. No. 11,195,350.

(51) Int. Cl.
*G07C 5/08* (2006.01)
*F16H 48/20* (2012.01)
*F16H 48/34* (2012.01)

(52) U.S. Cl.
CPC ........... *G07C 5/0816* (2013.01); *F16H 48/34* (2013.01); *F16H 2048/204* (2013.01)

(58) Field of Classification Search
CPC .. G07C 5/0816; F16H 48/34; F16H 2048/204
See application file for complete search history.

(56) References Cited

U.S. PATENT DOCUMENTS

| | | | |
|---|---|---|---|
| 6,179,304 B1 | 1/2001 | Ishikawa et al. | |
| 6,813,583 B2 | 11/2004 | Kumar et al. | |
| 7,276,014 B2 | 10/2007 | Goto et al. | |
| 7,878,314 B2 | 2/2011 | Pinkos | |
| 8,100,805 B2 | 1/2012 | Dayton | |
| 8,109,358 B2 | 2/2012 | Dayton | |
| 9,511,635 B2 | 12/2016 | Berkness et al. | |
| 10,352,729 B2 | 7/2019 | Suntharalingam | |
| 11,804,081 B2 * | 10/2023 | Lofthouse | G07C 5/0816 |
| 2004/0002794 A1 | 1/2004 | Pillar et al. | |
| 2006/0154776 A1 | 7/2006 | Claussen et al. | |
| 2006/0270512 A1 | 11/2006 | Pinkos | |
| 2007/0142155 A1 | 6/2007 | Schumacher | |
| 2013/0017927 A1 | 1/2013 | Morscheck et al. | |
| 2018/0051786 A1 | 2/2018 | Krishnan et al. | |
| 2018/0257659 A1 | 9/2018 | Nguyen | |

FOREIGN PATENT DOCUMENTS

WO        0166397 A1    9/2001

* cited by examiner

*Primary Examiner* — Daryl C Pope
(74) *Attorney, Agent, or Firm* — McCoy Russell LLP

(57) ABSTRACT

Methods and systems for operating axles of a vehicle are provided. In one example, an apparatus is configured to consume a first amount of electric power to indicate a first axle operating state. The apparatus is also configured to consume a second amount of electric power to indicate a second axle operating state.

17 Claims, 6 Drawing Sheets

SYSTEM AND METHOD FOR CONTROLLING A LOCKING DIFFERENTIAL OF AN AXLE

CROSS REFERENCE TO RELATED APPLICATIONS

The present application is a continuation of U.S. Non-Provisional patent application Ser. No. 17/448,027, entitled "SYSTEM AND METHOD FOR CONTROLLING A LOCKING DIFFERENTIAL OF AN AXLE" and filed on Sep. 17, 2021. U.S. Non-Provisional patent application Ser. No. 17/448,027 is a continuation of U.S. Non-Provisional patent application Ser. No. 16/847,530, entitled "SYSTEM AND METHOD FOR CONTROLLING A LOCKING DIFFERENTIAL OF AN AXLE", and filed on Apr. 13, 2020. The entire contents of the above-listed applications are hereby incorporated by reference for all purposes.

TECHNICAL FIELD

The present disclosure relates to a system and method for emulating operation of a status indicator for an original equipment manufacturer locking differential gear set. The system and method allow status of a non-original equipment manufacturer locking differential gear set to be displayed like the status of the original equipment manufacturer locking gear set is displayed.

BACKGROUND AND SUMMARY

A vehicle may include one or more axles including differentials that may be selectively locked to improve traction when the vehicle is driven off road or on a surface that has a low coefficient of friction. The differentials in the one or more axels may be locked via a controller when wheel slip is detected. Further, the differentials in the one or more axles may be unlocked via the controller when wheel slip is not detected. However, for some off-road enthusiast, manually selectable locking axles are a preferred axle configuration because the human vehicle driver has control over when the differential locks are engaged and disengaged. Although some vehicle owners favor manually operated differential locks, some vehicle owners may not be satisfied with original equipment manufacturer axles and differentials, even if the differential locks may be manually operated. For example, some off-road enthusiasts prefer a different axle ratio than the axle ratio that the original equipment manufacturer provided with the vehicle. In addition, some vehicle owners may have a personal preference for an axle manufacturer other than the original equipment manufacturer. Further, some vehicle owners may wish to increase a torque capacity of their vehicle's axles. As such, some vehicle owners may wish to swap out an axle that was provided by an original equipment manufacturer with an aftermarket axle. Yet, the vehicle systems may not be suitably integrated with the aftermarket axle. In particular, the vehicle systems may not be able to recognize whether or not the differential of the aftermarket axle is locked or unlocked. Therefore, it may be desirable to provide a way interfacing between an aftermarket or non-original equipment manufacturer axle and vehicle systems so that vehicle systems may determine if the differentials are locked or unlocked.

The inventors herein have recognized the above-mentioned issues and have developed a method for indicating a status of an axle differential locking mechanism, comprising: electrically coupling a device to a conductor configured to supply electrical power to an axle locking mechanism; flowing a first current in response to a threshold voltage being applied to the conductor and the device; and flowing a second current in response to the threshold voltage not being applied to the conductor and the device.

By flowing a first current in response to a threshold voltage being applied to a conductor configured to supply electrical power to an axle locking mechanism and a device that is electrically coupled to the conductor, and by flowing a second current in response to the threshold voltage not being supplied to the conductor and the device, it may be possible to provide the technical result of providing a way of interfacing a non-original manufacturer axle with existing systems of a vehicle. In particular, the device may be configured so that the first current may be flowing when electrical power is supplied to the axle locking mechanism to lock the axle differential. In addition, the device may be configured so that the second current may be flowing when electrical power is not supplied to the axle locking mechanism. Thus, the device may influence which of two distinct electrical current amounts may be observed by a vehicle controller as an indication that the axle differential is locked or unlocked. The controller may perform actions that are based on which of the two distinct electric current amounts is flowing.

The present description may provide several advantages. In particular, the approach may allow an unmodified vehicle controller to interface with a non-original equipment manufacturer axle. In addition, the approach may allow vehicle occupants to observe whether or not an axle differential locking mechanism actuator is or is not receiving electrical power to operate. Further, the approach may be implemented so that non-original equipment manufacturer axle appears to operate like an original equipment manufacturer axle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
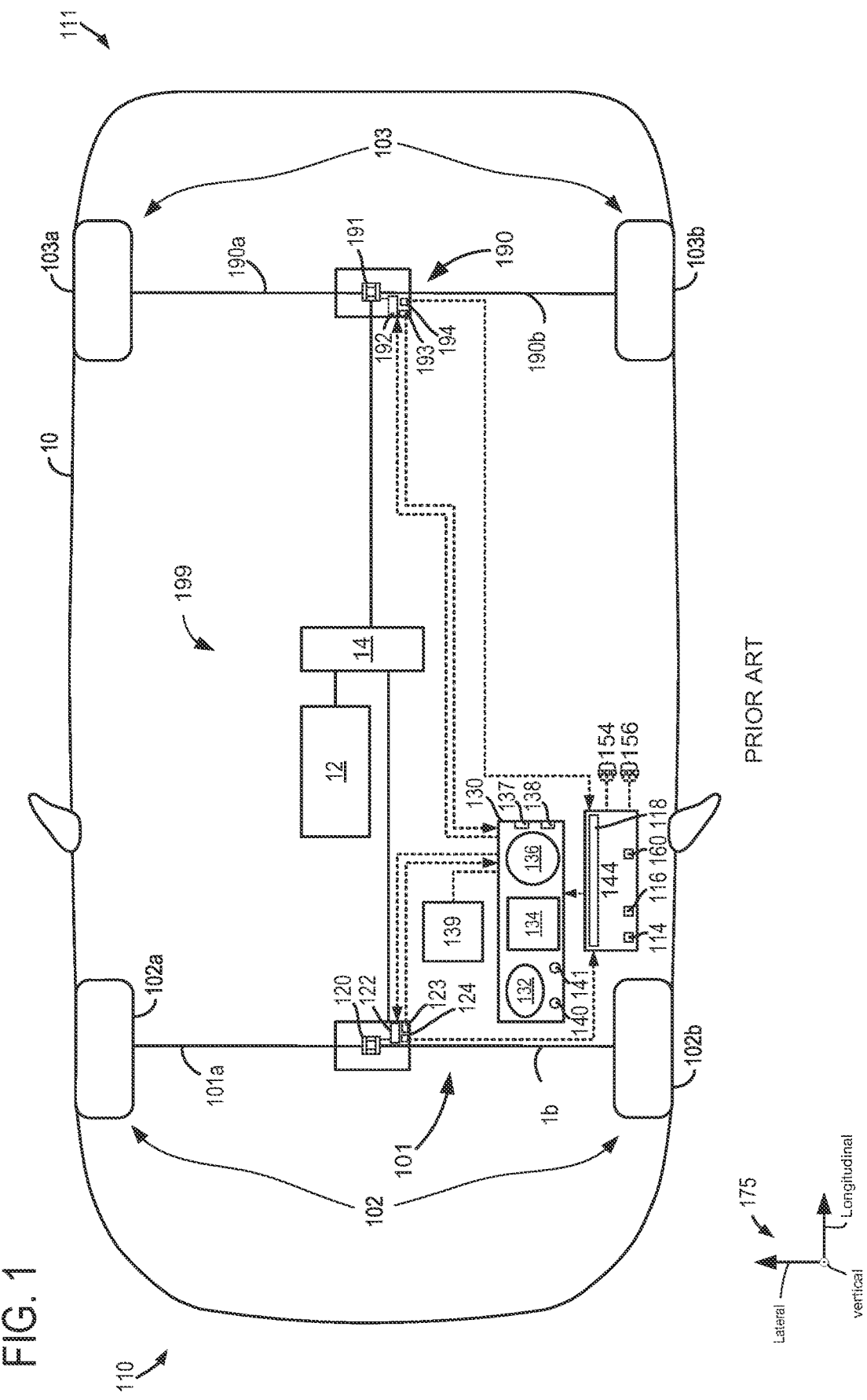
FIG. 1 is a schematic diagram of an original equipment manufacturer driveline assembly and control circuitry is shown.
Figure 2:
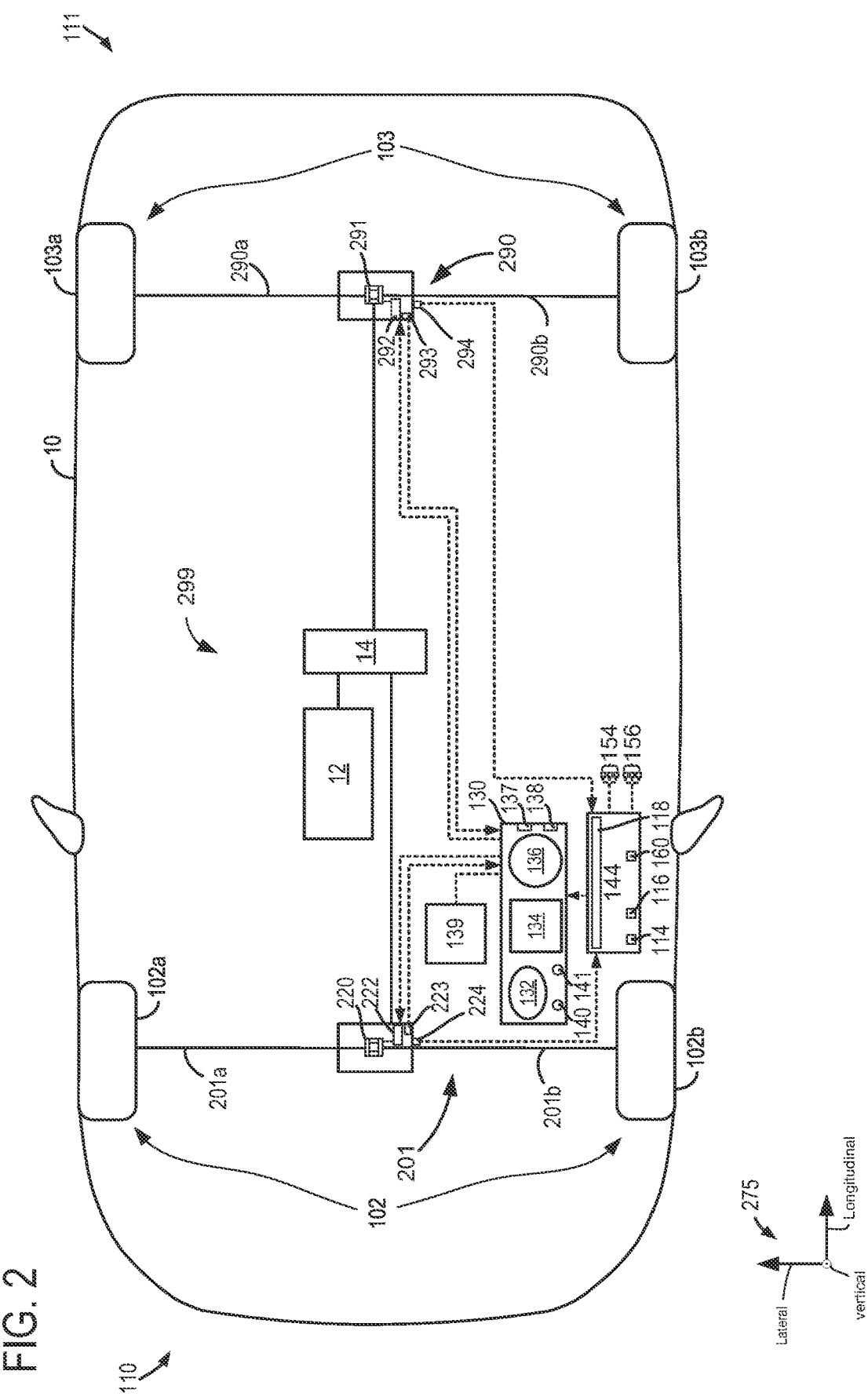
FIG. 2 is a schematic diagram of the driveline assembly of FIG. 1 that has been modified to include axles of a non-original equipment manufacturer and circuitry to emulate operation of the original equipment manufacturer driveline assembly.
Figure 3:
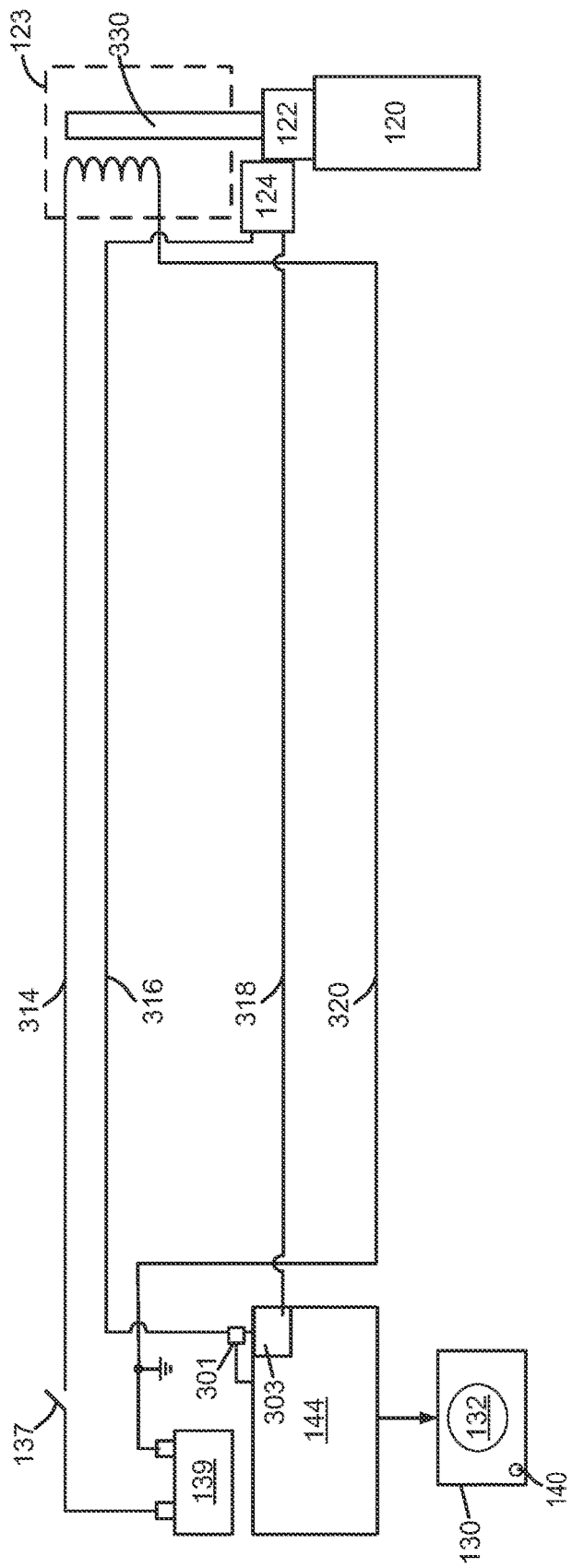
FIG. 3 is a schematic of prior art circuitry for interfacing an axle with a controller and dashboard instrumentation
Figure 4:
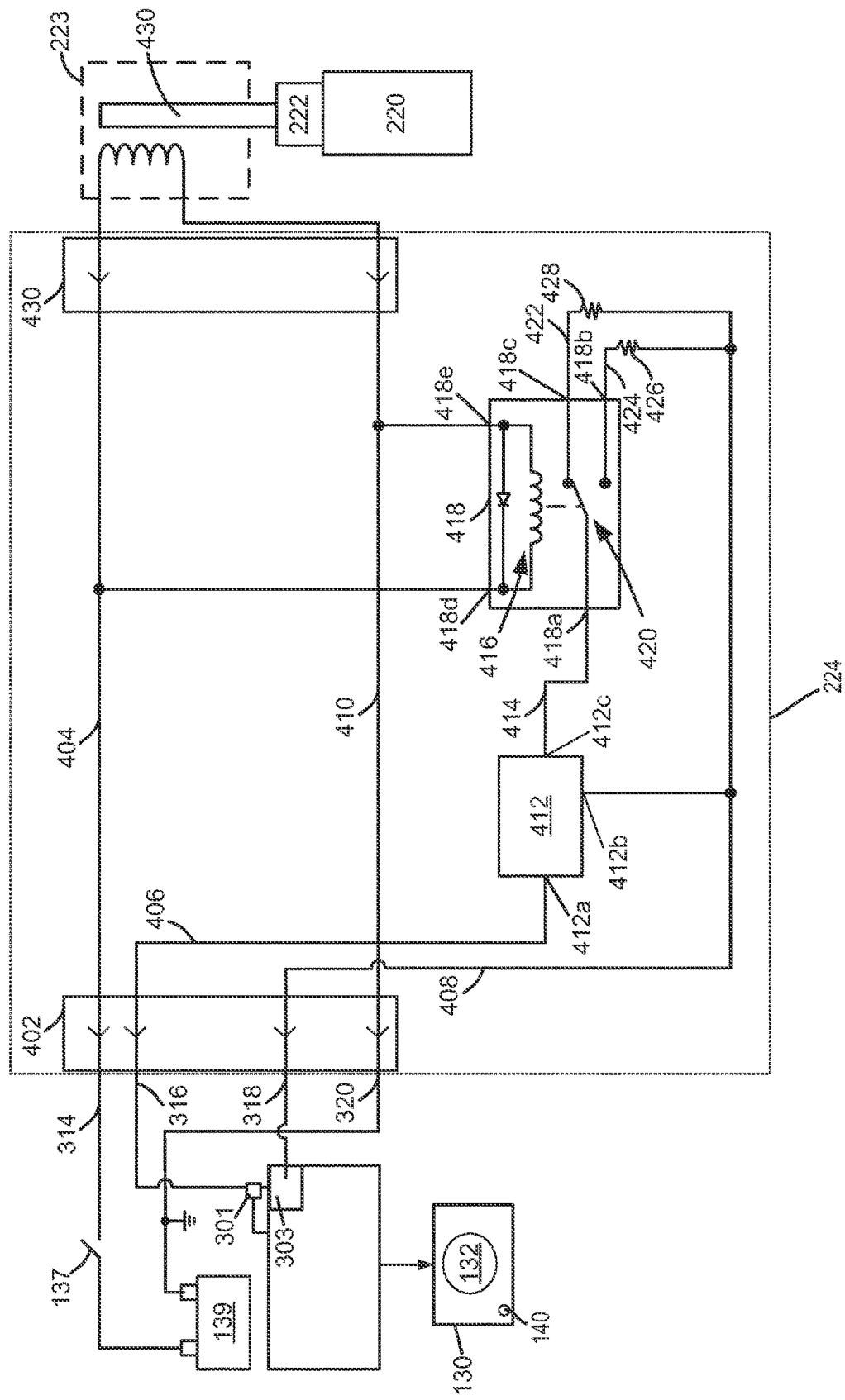
FIG. 4 is a schematic of circuitry for emulating operation of the original equipment manufacturer driveline assembly shown in FIG. 1.
Figure 5:
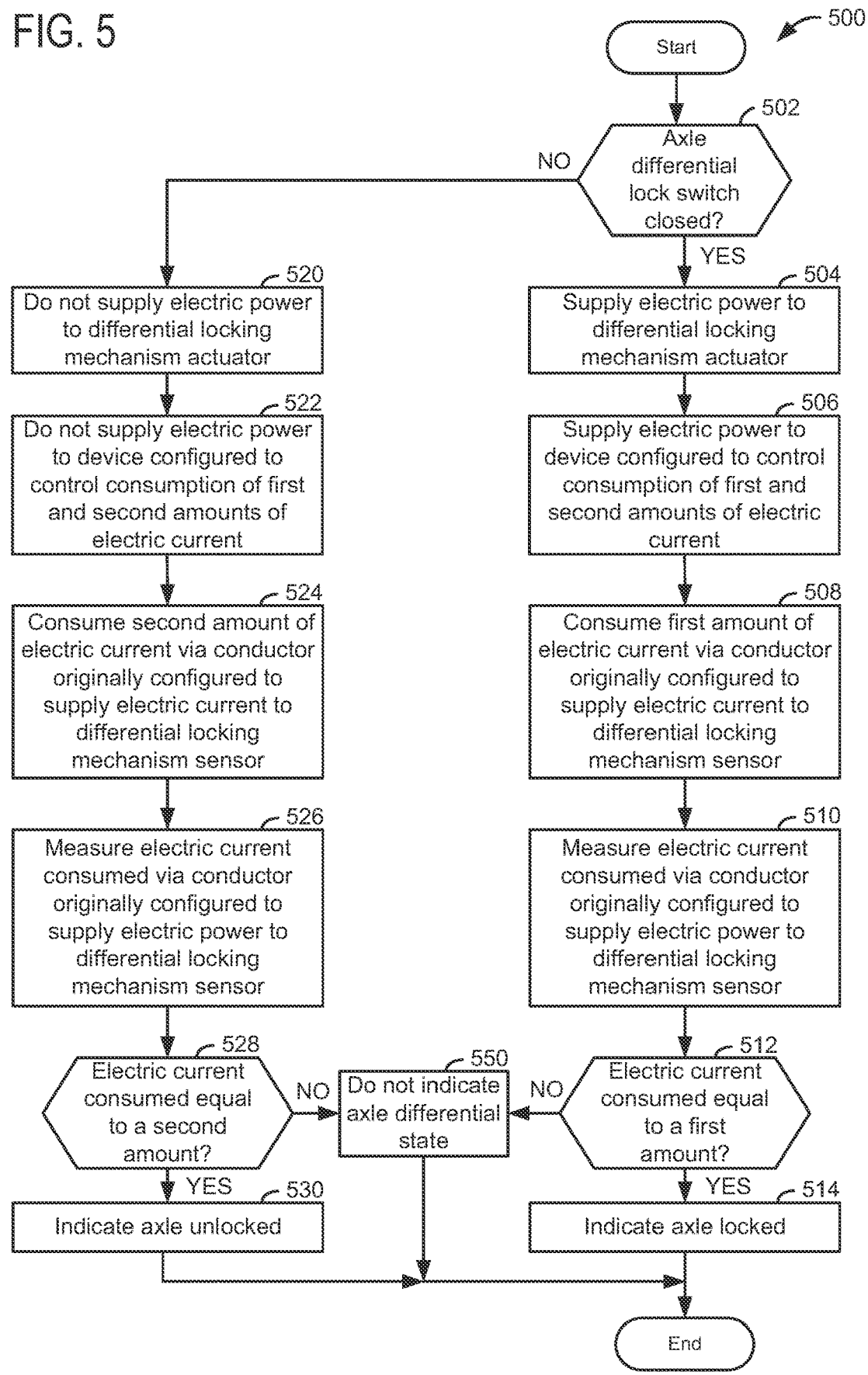
FIG. 5 is a flowchart of an example method for operating a non-original equipment manufacturer driveline assembly in a way that emulates an original equipment driveline assembly.
Figure 6:
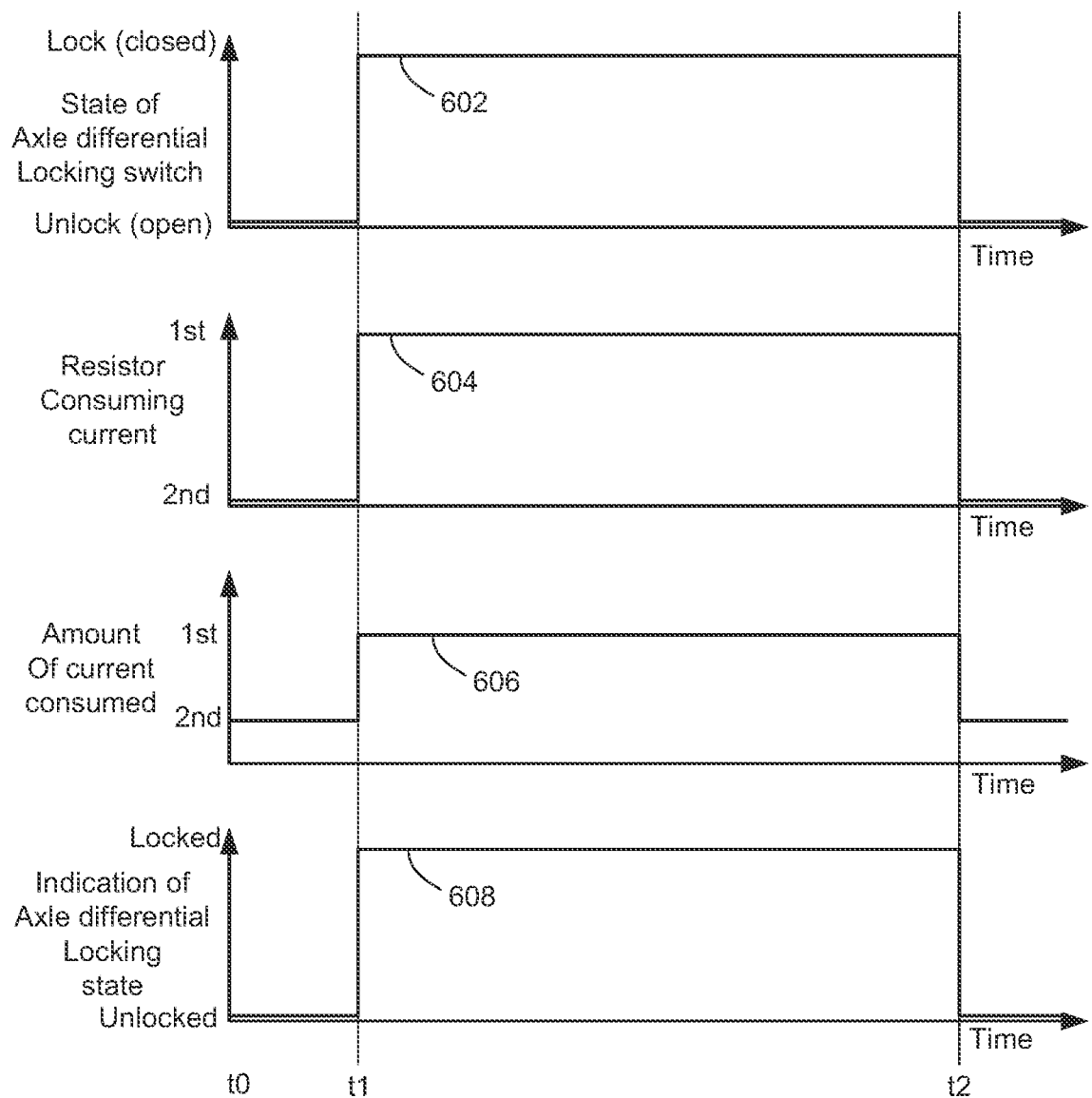
FIG. 6 shows an example axle differential gear locking sequence according to the system and method described herein.

The following description relates to systems and methods for operating a differential of an axle that may be selectively locked and unlocked via manually operated switches. The axle and differential may be an aftermarket or non-original manufacturer equipment that may be configured differently than original manufacturer equipment. The system and method described herein may allow the non-original manufacturer equipment to operate in a similar way as original manufacturer equipment. An original manufacturer equipment driveline is shown in FIG. 1. A non-original manufacturer equipment driveline is shown in FIG. 2. An electric circuit for operating an original equipment axle is shown in FIG. 3. An electric circuit that allows the non-original manufacturer equipment driveline of FIG. 2 to operate in a similar way as the original manufacturer equipment is shown in FIG. 4. A method for operating a non-original manufacturer equipment driveline similar to a way that the original manufacturer equipment driveline operates is shown in FIG. 5. An example axle differential locking sequence is shown in FIG. 6.

FIG. 1 illustrates an example prior art vehicle driveline 199 included in vehicle 10. Mechanical connections are shown in FIG. 1 as solid lines and electrical connections are indicated as dashed lines.

Vehicle 10 includes a front side 110 and a rear side 111. Vehicle 10 includes front wheels 102 and rear wheels 103. In this example, vehicle 10 is configured as a four wheel drive vehicle; however, in other examples, vehicle 10 may be configured as a two wheel drive vehicle. Vehicle 10 includes a propulsion source 12 that may selectively provide propulsive effort to front axle 101 and rear axle 190. Propulsion source 12 may be an internal combustion engine (e.g., spark ignited or diesel), or alternatively, propulsion source 12 may be an electric machine (e.g., a motor/generator). Propulsion source is shown mechanically coupled to gearbox 14, and gearbox 14 is mechanically coupled to front axle 101 and rear axle 190. Propulsion source 12 may provide mechanical power to gearbox 14. Front axle 101 and rear axle 190 may receive mechanical power from gearbox 14 and relay the mechanical power to front wheels 102 and rear wheels 103.

Rear axle 190 comprises two half shafts, including a first or right haft shaft 190a and a second or left half shaft 190b. The rear axle 190 may be an integrated axle that includes a differential gear set 191, differential locking mechanism 192, and differential locking mechanism actuator 193. Differential gear set 191 may be open when vehicle 10 is traveling on roads and negotiating curves so that right rear wheel 103a may rotate at a different speed than left rear wheel 103b. Differential gear set 191 allows vehicle 10 to turn without dragging right rear wheel 103a or left rear wheel 103b. However, if vehicle 10 is traveling on a road surface having a low coefficient of friction or off-road, differential locking mechanism 192 may be engaged to lock rear differential 191 via differential locking mechanism actuator 193. Differential locking mechanism actuator 193 may be an electric actuator (e.g., a solenoid) that moves differential locking mechanism 192, or it may be an actuator that includes an electrically operated solenoid and an air operated device, the electrically operated solenoid controlling air flow to the air operated device. Right rear wheel 103a rotates at a same speed as left rear wheel 103b when differential gear set 191 is locked via differential locking mechanism 192. Differential locking mechanism position sensor 194 may indicate whether differential gear set 191 is locked or unlocked to controller 144. Controller 144 may send status (e.g., unlocked or locked) information regarding differential gear set 191 to dashboard 130 for display to vehicle occupants (e.g., a human driver) based on current that is consumed via differential locking mechanism position sensor 194.

Likewise, front axle 101 comprises two half shafts, including a first or right haft shaft 101a and a second or left half shaft 101b. The front axle 101 may be an integrated axle that includes a differential gear set 120, differential locking mechanism 122, and differential locking mechanism actuator 123. Differential gear set 120 may be open when vehicle 10 is traveling on roads and negotiating curves so that right front wheel 102a may rotate at a different speed than left front wheel 101b. Differential gear set 120 allows vehicle 10 to turn without dragging right front wheel 102a or left front wheel 102b. However, if vehicle 10 is traveling on a road surface having a low coefficient of friction or off-road, differential locking mechanism 122 may be engaged to lock front differential 120 via differential locking mechanism actuator 123. Differential locking mechanism actuator 123 may be an electric actuator (e.g., a solenoid) that moves differential locking mechanism 122, or it may be an actuator that includes an electrically operated solenoid and an air operated device, the electrically operated solenoid controlling air flow to the air operated device. Right front wheel 102a rotates at a same speed as left front wheel 102b when differential gear set 120 is locked via differential locking mechanism 122. Differential locking mechanism position sensor 124 may indicate whether differential gear set 120 is locked or unlocked to controller 144. Controller 144 may send status (e.g., unlocked or locked) information regarding differential gear set 120 to dashboard 130 for display to vehicle occupants (e.g., a human driver) based on current that is consumed via differential locking mechanism position sensor 124.

Controller 144 may communicate with dash board 130, propulsion source 12, front axle 101, and rear axle 190. Controller 144 includes read-only memory (ROM or non-transitory memory) 114, random access memory (RAM) 116, a digital processor or central processing unit (CPU) 160, and inputs and outputs (I/O) 118 (e.g., digital inputs including counters, timers, and discrete inputs, digital outputs, analog inputs, and analog outputs). Controller 144 may receive signals from sensors 154 and provide control signal outputs to actuators 156. Sensors 154 may include but are not limited to front axle differential locking mechanism sensor 124 and rear axle differential locking mechanism position sensor 194. Actuators 156 may include but are not limited to propulsion source torque actuators (e.g., throttles, inverters, fuel injectors, etc.).

Vehicle propulsion system may also include a dashboard 130 that an operator of the vehicle may interact with. Dashboard 130 may include an interactive weather data display and notification system 134 that may communicate weather forecast data to controller 144. Dashboard 130 may further include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via controller 144. As such, in some examples, the vehicle operator may communicate via display system 132 with an internet site or software application (app) and controller 144. Dashboard 130 and devices included therein may be supplied with electrical power via battery 139. Battery 139 may also supply power to controller 114 and a starter motor (not shown) for propulsion source 12.

Dashboard 130 may further include an operator interface 136 via which the vehicle operator may adjust the operating status of the vehicle. Specifically, the operator interface 136 may be configured to initiate and/or terminate operation of the vehicle driveline (e.g., propulsion source 12) based on an operator input. Various examples of the operator interface 136 may include interfaces that require a physical apparatus, such as an active key, that may be inserted into the operator interface 136 to activate the propulsion source 12 and to turn on the vehicle 10, or may be removed to shut down the propulsion source 12 and to turn off the vehicle. Other examples may include a passive key that is communicatively coupled to the operator interface 136. The passive key may be configured as an electronic key fob or a smart key that does not have to be inserted or removed from the interface 136 to operate the propulsion source 12. Still other examples may additionally or optionally use a start/stop button that is manually pressed by the operator to start or shut down the propulsion source 12. Spatial orientation of vehicle 10 is indicated via axes 175.

A human or autonomous driver may request locking and unlocking of front axle differential 120 via a first dashboard switch 137. The human driver may also request locking and unlocking of rear axle differential 191 via second dashboard switch 138. Controller 144 may indicate that front axle differential 120 is locked or unlocked via lamp 140. Controller 144 may also indicate that rear axle differential 191 is locked or unlocked via lamp 141. Alternatively, controller 144 may indicate the locking/unlocking status of front differential 120 and rear differential 191 via display system 132.

Turning now to FIG. 2, an example vehicle driveline 299 included in vehicle 10 is shown. Mechanical connections are shown in FIG. 1 as solid lines and electrical connections are indicated as dashed lines. Components that are shown in FIG. 2 that are the same as components shown in FIG. 1 are indicated with like numbers. For example, controller 144 shown in FIG. 1 is the same controller 144 as shown in FIG. 2. Front axle 101 shown in FIG. 1 is different from front axle 201 shown in FIG. 2. Therefore, for the sake of brevity, the description of components shown in FIG. 2 that are the same as components shown in FIG. 1 may be omitted.

In this example driveline, rear axle 290 comprises two half shafts, including a first or right haft shaft 290a and a second or left half shaft 290b. The rear axle 290 may be an integrated axle that includes a differential gear set 291, differential locking mechanism 292, and differential locking mechanism actuator 293. Differential gear set 291 may be open when vehicle 10 is traveling on roads and negotiating curves so that right rear wheel 103a may rotate at a different speed than left rear wheel 103b. Differential gear set 291 allows vehicle 10 to turn without dragging right rear wheel 103a or left rear wheel 103b. However, if vehicle 10 is traveling on a road surface having a low coefficient of friction or off-road, differential locking mechanism 292 may be engaged to lock rear differential 291 via differential locking mechanism actuator 293. Differential locking mechanism actuator 293 may be an electric actuator (e.g., a solenoid) that moves differential locking mechanism 292, or it may be an actuator that includes an electrically operated solenoid and an air operated device, the electrically operated solenoid controlling air flow to the air operated device. Right rear wheel 103a rotates at a same speed as left rear wheel 103b when differential gear set 291 is locked via differential locking mechanism 292. Electric locking differential expansion module 294 may emulate a first amount of current that flows to differential locking mechanism position sensor 124 shown in FIG. 1 when differential locking mechanism 292 is engaged to lock read differential 291. Electric locking differential expansion module 294 may also emulate a second amount of current that flows to differential locking mechanism position sensor 124 shown in FIG. 1 when differential locking mechanism 292 is not engaged to lock read differential 291. Controller 144 may send status (e.g., unlocked or locked) information regarding differential gear set 291 to dashboard 130 for display to vehicle occupants (e.g., a human driver) based on electric current that flows via electric locking differential expansion module 294. The torque rating or gear ratio of axle 201 may be different than that of axle 101 shown in FIG. 1.

Likewise, front axle 201 comprises two half shafts, including a first or right haft shaft 201a and a second or left half shaft 201b. The front axle 201 may be an integrated axle that includes a differential gear set 220, differential locking mechanism 222, and differential locking mechanism actuator 223. Differential gear set 220 may be open when vehicle 10 is traveling on roads and negotiating curves so that right front wheel 102a may rotate at a different speed than left front wheel 101b. Differential gear set 220 allows vehicle 10 to turn without dragging right front wheel 102a or left front wheel 102b. However, if vehicle 10 is traveling on a road surface having a low coefficient of friction or off-road, differential locking mechanism 222 may be engaged to lock front differential 220 via differential locking mechanism actuator 223. Differential locking mechanism actuator 223 may be an electric actuator (e.g., a solenoid) that moves differential locking mechanism 222, or it may be an actuator that includes an electrically operated solenoid and an air operated device, the electrically operated solenoid controlling air flow to the air operated device. Right front wheel 102a rotates at a same speed as left front wheel 102b when differential gear set 220 is locked via differential locking mechanism 222. Electric locking differential expansion module 224 may emulate a first amount of current that flows to differential locking mechanism position sensor 124 shown in FIG. 1 when differential locking mechanism 122 is engaged to lock front differential 120. Electric locking differential expansion module 224 may also emulate a second amount of current that flows to differential locking mechanism position sensor 124 shown in FIG. 1 when differential locking mechanism 122 is not engaged to lock front differential 120. Controller 144 may send status (e.g., unlocked or locked) information regarding front differential gear set 220 to dashboard 130 for display to vehicle occupants (e.g., a human driver) based on current that is consumed via electric locking differential expansion module 224. The torque rating or gear ratio of axle 201 may be different than that of axle 101 shown in FIG. 1.

Controller 144 may communicate with dash board 130, propulsion source 12, front axle 201, and rear axle 290.

Controller 144 includes read-only memory (ROM or non-transitory memory) 114, random access memory (RAM) 116, a digital processor or central processing unit (CPU) 160, and inputs and outputs (I/O) 118 (e.g., digital inputs including counters, timers, and discrete inputs, digital outputs, analog inputs, and analog outputs). Controller 144 may receive signals from sensors 154 and provide control signal outputs to actuators 156. Sensors 154 may include but are not limited to front axle electric locking differential expansion module 224 and rear axle electric locking differential expansion module 294. Actuators 156 may include but are not limited to propulsion source torque actuators (e.g., throttles, inverters, fuel injectors, etc.).

A human or autonomous driver may request locking and unlocking of front axle differential 220 via a first dashboard switch 137. The human driver may also request locking and unlocking of rear axle differential 291 via second dashboard switch 138. Controller 144 may indicate that front axle differential 220 is locked or unlocked via lamp 140. Controller 144 may also indicate that rear axle differential 291 is locked or unlocked via lamp 141. Alternatively, controller 144 may indicate the locking/unlocking status of front differential 220 and rear differential 291 via display system 132.

Thus, vehicle 10 may include different axles than those shown in FIG. 1, yet controller 144 may provide the same axle status (e.g., state of differential locking mechanism) for the driveline system that is shown in FIG. 2. Further, operator actions and notifications of axle status to operate the driveline system shown in FIG. 2 may be identical to the operator actions and notifications of axle status to operate the driveline shown in FIG. 1. Accordingly, from a user's point of view, operation of the system in FIG. 2 may appear to be identical to the operation of the system shown in FIG. 1, even though there may be some differences in the actual hardware.

Referring now to FIG. 3, prior art wiring for a locking/locking and displaying operational status of an axle differential is shown. Differential locking mechanism actuator 123 may include a plunger 330 for adjusting a position of differential locking mechanism 122. Differential gear set 120 may be locked so that front wheels 102 rotate at a same speed irrespective of the driving surface when plunger 330 moves differential locking mechanism 122 into a position where it engages differential gear set 120. Alternatively, differential locking mechanism actuator 123 may include a pintle 330 for adjusting air flow to differential locking mechanism 122. Front axle differential locking mechanism sensor 124 may sense a position of plunger/pintle 330 or differential locking mechanism 122 to determine if differential gear set 120 is locked or unlocked. In one example, front axle differential locking mechanism sensor 124 may consume, or may allow to flow, a first amount of electrical current when plunger/pintle 330 or differential locking mechanism 122 interferes with a magnetic field that is generated by front axle differential locking mechanism sensor 124 (e.g., a Hall effect sensor). Front axle differential locking mechanism sensor 124 may consume, or may allow to flow, a second amount of electrical current when plunger/pintle 330 or differential locking mechanism 122 does not interfere with a magnetic field that is generated by front axle differential locking mechanism sensor 124. The differential locking mechanism actuator 123, front axle differential locking mechanism sensor 124, differential locking mechanism 122, and differential gear set 120 may be included with front axle 101. The rear axle 190 may be configured in a similar way.

First electrical conductor 314 selectively carries electrical power from battery 139 to differential locking mechanism actuator 123 depending on a position of switch 137 (e.g., front differential lock/unlock switch). Fourth electrical conductor 320 returns from differential locking mechanism actuator 123 to the battery 139. Second electrical conductor 316 carries electrical power from power source 303 to front axle differential locking mechanism sensor 124. Electric power source 303 is shown as being part of controller 144; however, in some examples, battery 139 may supply electrical power to front axle differential locking mechanism sensor 124. Third electrical conductor 318 returns from front axle differential locking mechanism sensor 124 to the electric power source 303.

Controller 144 may determine an amount of current that flows through second electrical conductor 316 via current sensor 301 to determine whether or not differential gear set 120 is locked or unlocked. For example, if controller 144 determines that a first current is flowing through second conductor 316, controller 144 may indicate that the differential gear set 120 is locked. If controller 144 determines that a second current is flowing through second conductor 316, controller 144 may indicate that the differential gear set 120 is unlocked. If controller 144 determines that neither the first current nor the second current is flowing through second electrical conductor 316, controller 144 may determine that there is an open or short circuit and that the state of differential gear set 120 is indeterminate. Controller 144 may display a status (e.g., an indication of being locked or unlocked) of differential gear set 120 on dashboard 130 via lamp 140 and/or display system 132.

It should be noted that controller 144 may determine that a first current is present when electric current flowing through conductor 316 is equal to a first predetermined threshold electric current plus or minus an offset current amount. Likewise, controller 144 may determine that a second current is present when electric current flowing through conductor 316 is equal to a second predetermined threshold electric current plus or minus an offset current amount.

Referring now to FIG. 4, an electric locking differential expansion module 224 for a locking/unlocking and displaying operational status of an axle differential is shown. In one example, electric locking differential expansion module 224 may include a voltage regulator 412, a first device 418, a first resistor 426, a second resistor 428, and two electrical connectors (e.g., 402 and 430). Some components shown in FIG. 3 are also shown in FIG. 4 and these components may be identified by like numbering. For example, controller 144 of FIG. 3 is identical to controller 144 of FIG. 4. The components that are common to FIG. 3 and FIG. 4 operate in a same way unless otherwise indicated. Therefore, for the sake of brevity the description of some of these components may be omitted.

Electric locking differential expansion module 224 is shown positioned between controller 144 and differential locking mechanism actuator 123. Differential locking mechanism actuator 123 may include a plunger 430 for adjusting a position of differential locking mechanism 122. Differential gear set 220 may be locked so that front wheels 102 rotate at a same speed irrespective of the driving surface when plunger 430 moves differential locking mechanism 122 into a position where it engages differential gear set 120. Alternatively, differential locking mechanism actuator 123 may include a pintle 430 for adjusting air flow to differential locking mechanism 222. A front axle differential locking mechanism sensor 124 may not be included. The differential locking mechanism actuator 223, differential locking mechanism 222, and differential gear set 220 may be included with front axle 201. The rear axle 290 may be configured in a similar way.

First electrical conductor 314 selectively carries electrical power from battery 139 to conductor 404 via electric connector 402 when switch 137 is closed. Electric conductor 404 may supply electric power to differential locking mechanism actuator 223 depending on a position of switch 137. Electric conductor 404 may be referred to as a second power input of electric locking differential expansion module 224. Fourth electrical conductor 320 returns electric power from differential locking mechanism actuator 223 to the battery 139 via electric connector 402 and electric connector 430. Second electrical conductor 316 carries electrical power from power source 303 to electric conductor 406, and electric conductor 406 supplies electric power to power supply or voltage regulator 412 at voltage input 412a. Electric conductor 406 may be referred to as a first power input of electric locking differential expansion module 224. Ground pin 412b is electrically coupled to electric conductor 408. Voltage output pin 412c is electrically coupled to conductor 414. Electric conductor 316 is electrically coupled to electric power source 303. Electric power source 303 is shown as being part of controller 144; however, in some examples, battery 139 may supply electrical power to voltage regulator 412. Third electrical conductor 318 returns electric power from front axle differential locking mechanism sensor 124 to the electric power source 303 via conductor 410. Conductor 410 is electrically coupled to conductor 318 via electric connector 402. Conductor 410 is electrically coupled to differential locking mechanism actuator 223 via electric connector 430.

Electric locking differential expansion module 224 includes a device 418 to selectively permit electric current to flow through second resistor 428 and first resistor 426. Alternatively, resistors 426 and 428 may be replaced by electric current sources that are controlled via device 418. In this example, device 418 is shown as a single pole double throw relay, but it may be comprised of transistors, resistors, and/or digital logic that may operate in other known relay (e.g., latching, double pole double through, etc.) and/or logic configurations in other examples. Device 418 is shown in a deactivated state (e.g., when a threshold voltage and amount of electric power is not present at conductor 404) where a second amount of current flows through conductors 316 and 406. The second amount of current flows to and may be consumed via voltage regulator 412 and flowing electric current through second resistor 428 without flowing electric current through the first resistor 426. The second amount of current may be sensed via controller 144 and current sensor 301. Electric current flows from conductor 414 to conductor 422 when contacts 420 are in a normally closed state as shown.

Device 418 may enter an activated state when a threshold voltage and amount of electric power is present at conductor 404 relative to conductor 410. Device 418 includes a first signal input 418a, a first signal output 418b, a second signal output 418c, and control voltage inputs 418d and 418e. Applying or removing a threshold amount of electric power from control voltage inputs 418d and 418e may cause an operating state change in device 418. For example, device 418 may electrically couple first signal input 418a to first signal output 418c and electrically decouple first signal input 418b from second signal output 418c when less than a threshold voltage is applied across control voltage inputs 418d and 418e. Device 418 may electrically decouple first signal input 418a from first signal output 418c and electrically couple first signal input 418b to second signal output 418c when greater than a threshold voltage is applied across control voltage inputs 418d and 418e. The electric power that is applied to conductor 404 may urge differential locking mechanism actuator 223 to cause differential locking mechanism 222 to engage and lock differential gear set 220. At the same time, the electric power may energize relay coil 416 to change the state of contacts 420 so that electric current may flow from conductor 414 to conductor 424. A first amount of current may flow through conductors 316 and 406 when device 418 is activated. The first amount of current flows to and may be consumed via voltage regulator 412 and flowing electric current through first resistor 426 without flowing electric current through the second resistor 428. The first amount of current may be sensed via controller 144 and current sensor 301.

Controller 144 may determine an amount of current that flows through second electrical conductor 316 via current sensor 301 to determine whether or not differential gear set 220 is locked or unlocked. For example, if controller 144 determines that a first current is flowing through second conductor 316, controller 144 may indicate that the differential gear set 220 is locked. If controller 144 determines that a second current is flowing through second conductor 316, controller 144 may indicate that the differential gear set 220 is unlocked. Controller 144 may display a status (e.g., an indication of being locked or unlocked) of differential gear set 220 on dashboard 130 via lamp 140 and/or display system 132.

While electric locking differential expansion module 224 is shown with voltage regulator 412, voltage regulator 412 may not be included in some examples. Rather, a voltage may be supplied via a controller, power supply, or other source that may be external to electric locking differential expansion module 224. In addition, the circuitry shown in FIG. 4 may be expanded to systems that include more than one output states (e.g., locked, unlocked, and transitioning) via increasing the number of regulated electric current outputs (e.g., resistors or current sources). Further, in some examples, actuator response times may be emulated via including additional capacitors in electric locking differential expansion module 224. For example, a capacitor may be coupled between conductors 414 and 318. Finally, the circuitry shown in electric locking differential expansion module 224 may be applied to front and rear axle disconnects.

Thus, the system of FIGS. 2 and 4 provides for a system for indicating operating status of a differential gear set of an axle, comprising: a circuit configured to flow a first amount of electric current while the differential gear set of the axle is in a locked state, the circuit configured to flow a second amount of electric current while the differential gear set of the axle is in an unlocked state, the circuit including a first power input and a second power input. The system includes where the first power input receives power via a conductor configured to supply power to a sensor. The system includes where the second power input receives power via conductor configured to supply power to a solenoid. The system includes where the first amount of electric current and the second amount of electric current are supplied via the first power input. The system includes where the second power input is electrically coupled to a control input of a relay. The system includes where the relay is a single pole double throw relay.

The system of FIGS. 2 and 4 also provides for a system for interfacing a vehicle to a non-original manufacturer axle, comprising: a first electric power conductor; a second electric power conductor; and an apparatus including a control input and a signal input, the control input directly electrically coupled to the first electric power conductor, the apparatus configured to change operating state from flowing a first amount of electric current to flowing a second amount of electric current in response to a threshold amount of electric power being applied to the first electric power conductor. The system further comprises a voltage regulator. The system includes where the voltage regulator is electrically coupled to the signal input. The system includes where the apparatus is in electric communication with a first resistor via a first signal output of the apparatus, and where the apparatus is in electric communication with a second resistor via a second signal output of the apparatus. The system includes where an operating state of the apparatus may be changed via applying electric power to the control input, and where an operating state of the apparatus may not be changed via applying electric power to the signal input. The system includes where first electric power conductor is configured to supply electric power to a differential locking mechanism actuator.

Referring now to FIG. 5, an example method for operating a non-original equipment manufacturer driveline assembly in a way that emulates operation of an original equipment driveline assembly is shown. At least portions of method FIG. 5 may be performed via a human in cooperation with the system of FIGS. 2 and 4. In some examples, at least portions of method FIG. 5 may be incorporated as executable instructions stored in non-transitory memory of a controller. In addition, some portions of the method may be performed via the controller transforming operating states of devices and actuators in the physical world. The method of FIG. may be applied to front and rear axles of a vehicle.

At 502, method 500 judges if a differential lock/unlock switch (e.g., 137 of FIG. 4) is in a closed state. Electric current may flow from differential lock/unlock switch 137 to relay 418 and differential locking mechanism actuator 223 when differential lock/unlock switch 137 is in a closed state. If the differential lock/unlock switch is in a closed state, the answer is yes and method 500 proceeds to 504. Otherwise, the answer is no and method 500 proceeds to 520.

At 504, electric power is supplied to the differential locking mechanism actuator (e.g., 223 of FIG. 4). The electric power may be supplied to the differential locking mechanism actuator via a vehicle battery (e.g., 139 of FIG. 4) or via a power supply (e.g., 303 of FIG. 4). Method 500 proceeds to 506.

At 506, method 500 supplies electric power to a device that is configured to control a first amount and a second amount of electric current that flows from or may be consumed from the vehicle battery or power supply. In one example, the device may be a single pole double throw relay (e.g., 418), but in other examples, the device may be a circuit that includes transistors, resistors, and/or combinational logic. The electric power may be provided by the same source of power that is provided to the differential locking mechanism actuator. Supplying electric power to the voltage control inputs of the device may change the operating state of the device so that electric current may flow from a first signal input to a first signal output of the device. Method 500 proceeds to 508.

At 508, method 500 flows or consumes a first amount of electric current via a conductor that was originally configured to supply electric current to an original equipment manufacturer differential locking mechanism sensor when the sensor detected a locked differential gear set. In one example, the first amount of electric current flows to or is consumed via a voltage regulator (e.g., 412 of FIG. 4) and a first resistor 426. The first amount of electric current may flow to or may be consumed via activating the device or relay as mentioned at 506. Method 500 proceeds to 510.

At 510, method 500 measures an amount of electric current that flows or may be consumed via the conductor (e.g., 316 of FIG. 4) that was originally configured to supply electric current to an original equipment manufacturer differential locking mechanism sensor when the sensor detected a locked differential gear set. The amount of electric current may be measured via a controller (e.g., controller 144 of FIG. 4). Method 500 proceeds to 512.

At 512, method 500 judges if the measured amount of electric current is equal to a predetermined first amount of electric current plus or minus an offset current amount. If so, the answer is yes and method 500 proceeds to 514. Otherwise, the answer is no and method 500 proceeds to 550.

At 514, method 500 indicates that the axle differential gear set is locked so that wheels of the axle rotate at a same speed and not at different speeds. Method 500 may indicate that the axle differential gear set is locked via illuminating a light or by providing a status message to a display. Method 500 proceeds to exit.

At 550, method 500 does not indicate that the axle differential gear set is locked or unlocked. Method 500 proceeds to exit.

At 520, electric power is not supplied to the differential locking mechanism actuator (e.g., 223 of FIG. 4). The differential locking mechanism actuator may return to a deactivated state and unlock the axle's differential gear set when electric power is not supplied to the differential locking mechanism actuator so that wheels of the axle may rotate at different speeds. Method 500 proceeds to 522.

At 522, method 500 does not supply electric power to the device that is configured to control a first amount and a second amount of electric current that flows from or is consumed from the vehicle battery or power supply. Removing electric power to the voltage control inputs of the device may change the operating state of the device so that electric current may flow from a first signal input to a second signal output of the device. Method 500 proceeds to 524.

At 524, method 500 flows or consumes a second amount of electric current via a conductor that was originally configured to supply electric current to an original equipment manufacturer differential locking mechanism sensor when the sensor detected an unlocked differential gear set. In one example, the second amount of electric current flows to or is consumed via a voltage regulator (e.g., 412 of FIG. 4) and a second resistor 428. The second amount of electric current may be consumed via activating the device or relay as mentioned at 522. Method 500 proceeds to 526.

At 526, method 500 measures an amount of electric current that flows through or may be consumed via the conductor (e.g., 316 of FIG. 4) that was originally configured to supply electric current to an original equipment manufacturer differential locking mechanism sensor when the sensor detected an unlocked differential gear set. The amount of electric current may be measured via a controller (e.g., controller 144 of FIG. 4). Method 500 proceeds to 528.

At 528, method 500 judges if the measured amount of electric current is equal to a predetermined second amount of electric current plus or minus an offset current amount. If so, the answer is yes and method 500 proceeds to 530. Otherwise, the answer is no and method 500 proceeds to 550.

At 530, method 500 indicates that the axle differential gear set is unlocked so that wheels of the axle rotate at different speeds. Method 500 may indicate that the axle differential gear set is locked via illuminating a light or by providing a status message to a display. Method 500 proceeds to exit.

In this way, a non-original equipment manufacturer axle may appear to operate in a same way as an original equipment manufacturer axle. This may allow vehicle owners to swap axles and display operating status of a new axle in a way that may be expected.

Thus, the method of FIG. 5 provides for a method for indicating a status of an axle differential locking mechanism, comprising: electrically coupling a device to a conductor configured to supply electrical power to an axle locking actuator; flowing a first current in response to a threshold voltage being applied to the conductor and the device; and flowing a second current in response to the threshold voltage not being applied to the conductor and the device. The method includes where the device is a single pole double throw relay. The method includes where the axle locking actuator is a solenoid. The method includes where the axle locking actuator selectively controls air flow to a component of an axle. The method further comprises supplying a voltage to a signal input of the device. The method includes where the voltage is supplied via a voltage regulator. The method further comprises monitoring the first current and the second current via a controller. The method further comprises providing an indication of locking status of the axle differential locking mechanism via the controller.

Referring now to FIG. 6, an example prophetic axle differential locking and unlocking sequence is shown. The sequence of FIG. 6 may be performed according to the method of FIG. 5 in cooperation with the system of FIGS. 2 and 4. Times of interest are indicated via vertical lines at t0-t2. The plots are aligned in time and occur at the same time.

The first plot from the top of FIG. 6 is a plot of a state of an axle differential locking switch (e.g., 317 of FIG. 4) versus time. The vertical axis represents the operating state of the axle differential locking switch. The axle differential locking switch is open when trace 602 is at a lower level near the horizontal axis. The axle differential locking switch is closed when trace 602 is at a higher level near the vertical axis arrow. The horizontal axis represents time and time increases from the left side of the plot to the right side of the plot. Trace 602 represents the state of the differential locking switch.

The second plot from the top of FIG. 6 is a plot that indicates which of a first and a second resistor are consuming electric current versus time. The vertical axis represents which resistor is consuming electric current to emulate operation of a differential locking sensor. The first resistor is consuming electric current when trace 604 is at a higher level that is near the vertical axis arrow. The second resistor is consuming electric current when trace 604 is at a lower level that is near the horizontal axis. The horizontal axis represents time and time increases from the left side of the plot to the right side of the plot. Trace 604 represents which resistor is consuming electric power.

The third plot from the top of FIG. 6 is a plot that indicates an amount of current that is consumed via the electric locking differential expansion module 224 to emulate operation of a differential locking mechanism position sensor. The vertical axis represents an amount of electric current that is consumed via the electric locking differential expansion module 224. The current amounts are indicated along the vertical axis. The horizontal axis represents time and time increases from the left side of the plot to the right side of the plot. Trace 606 represents the amount of electric current that is being consumed via the electric locking differential expansion module 224.

The fourth plot from the top of FIG. 6 is a plot of an indication of whether the axle differential is locked or unlocked versus time. The vertical axis represents whether there is an indication that the axle differential is locked or unlocked (e.g., via a light or display message). The axle differential is indicated as being unlocked when trace 608 is at a lower level near the horizontal axis. The axle differential is indicated as being unlocked when trace 608 is at a higher level near the vertical axis arrow. The horizontal axis represents time and time increases from the left side of the plot to the right side of the plot. Trace 608 represents whether a locked or unlocked differential is indicated.

At time t0, the axle differential locking switch is open so as to not request locking of the axle differential. The vehicle operator may place the switch in this position when the vehicle is traveling on a road or negotiating turns. The resistor consuming current is identified as a second resistor and the amount of current consumed by the resistor is low. The axle is indicated to be in an open state via the controller.

At time t1, the vehicle operator moves the axle differential locking switch from an open state to a closed state. Closing the axle differential locking switch may cause current to flow to a device that control current flow through the first and second resistors. In addition, closing the axle differential locking switch may cause the differential locking mechanism actuator 223 to change state and lock the axle differential. The indication of axle locking state is changed from unlocked to locked via the controller in response to the controller measuring current flowing through a conductor. The axle differential remains locked from time t1 to time t2.

At time t2, the vehicle operator returns the axle differential locking switch to the open state. Opening the axle differential locking switch may cause current to stop flowing to the device that controls current flow through the first and second resistors. In addition, opening the axle differential locking switch may cause the differential locking mechanism actuator 223 to change state and unlock the axle differential. The indication of axle locking state is changed from locked to unlocked via the controller in response to the controller measuring current flowing through a conductor.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for indicating a status of an axle differential locking mechanism, comprising:
   electrically coupling a device, positioned remote from a vehicle controller, to a conductor configured to supply electrical power to an axle locking actuator;
   flowing a first current in response to a threshold voltage being applied to the conductor and the device;
   flowing a second current in response to the threshold voltage not being applied to the conductor and the device;
   monitoring the first current and the second current via the controller;
   measuring electric current consumed via the conductor;
   responsive to the electric current consumed via the conductor equal to the first current, indicating the axle differential locking mechanism is locked; and
   responsive to the electric current consumed via the conductor equal to the second current, indicating the axle differential locking mechanism is unlocked.

2. The method of claim 1, where the device is a single pole double throw relay.

3. The method of claim 1, where the axle locking actuator is a solenoid, the method further comprising the controller communicating with a dashboard display to indicate the locking status.

4. The method of claim 1, where the axle locking actuator selectively controls air flow to a component of an axle, and where the device is positioned in an electric locking differential expansion module positioned between the controller and a differential locking mechanism actuator.

5. The method of claim 1, further comprising supplying a voltage to a signal input of the device, the device positioned in the electric locking differential expansion module mounted at an axle differential gear.

6. The method of claim 1, where the voltage is supplied via a voltage regulator.

7. The method of claim 1, where the device is a relay in electrical communication with the controller, the relay operating in a first state to enable the first current and operating in a second state to enable the second current, responsive to the power supplied to the axle locking actuator, the power also supplied to the relay.

8. A system for indicating operating status of a differential gear set of an axle, comprising:
   a controller; and
   an electric circuit positioned remote from the controller and configured to flow a first amount of electric current while the differential gear set of the axle is in a locked state, the circuit configured to flow a second amount of electric current while the differential gear set of the axle is in an unlocked state, the circuit including a first power input and a second power input,
   where the first power input receives power via a conductor configured to supply power to a sensor, and
   the controller is configured to indicate the differential gear set of the axle is locked responsive to a measured electric current consumed via the conductor equal to the first amount of electric current and indicate the differential gear set of the axle is unlocked responsive to the measured electric current consumed via the conductor equal to the second amount of electric current.

9. The system of claim 8, where the second power input receives power via the conductor configured to supply power to a solenoid.

10. The system of claim 9, where the first amount of electric current and the second amount of electric current are supplied via the first power input.

11. The system of claim 10, where the second power input is electrically coupled to a control input of a relay.

12. The system of claim 11, where the relay is a single pole double throw relay.

13. A system for interfacing a vehicle to a non-original manufacturer axle, comprising:
   a controller; and
   a remote module positioned at an axle remote from the controller, including:
      a first electric power conductor;
      a second electric power conductor; and
      an apparatus including a control input and a signal input, the control input directly electrically coupled to the first electric power conductor, the apparatus configured to change operating state from flowing a first amount of electric current to flowing a second amount of electric current in response to a threshold amount of electric power being applied to the first electric power conductor, where
      the first electric power conductor is configured to supply electric power to a differential locking mechanism actuator, the apparatus configured to indicate the differential locking mechanism is locked responsive to a measured electric current consumed via the first electric power conductor equal to the first amount of electric current and indicate the differential locking mechanism is unlocked responsive to the measured electric current consumed via the first electric power conductor equal to the second amount of electric current.

14. The system of claim 13, further comprising a voltage regulator.

15. The system of claim 14, where the voltage regulator is electrically coupled to the signal input.

16. The system of claim 13, where the apparatus is in electric communication with a first resistor via a first signal output of the apparatus, and where the apparatus is in electric communication with a second resistor via a second signal output of the apparatus.

17. The system of claim 13, where an operating state of the apparatus may be changed via applying electric power to the control input, and where an operating state of the apparatus may not be changed via applying electric power to the signal input.

\* \* \* \* \*